United States Patent
Wang

(10) Patent No.: US 10,928,938 B2
(45) Date of Patent: Feb. 23, 2021

(54) TOUCH MODULE, METHOD FOR MANUFACTURING THE SAME, AND ELECTRONIC DEVICE USING THE SAME

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Jin-Li Wang, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/536,432

(22) Filed: Aug. 9, 2019

(65) Prior Publication Data

US 2020/0326791 A1   Oct. 15, 2020

(30) Foreign Application Priority Data

Apr. 15, 2019 (CN) .......................... 201910299208.0

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC ........ G06F 3/0443; G06F 3/044; G06F 3/041; G06F 2203/04103
See application file for complete search history.

(56) References Cited

U.S. PATENT DOCUMENTS

| | | | |
|---|---|---|---|
| 2011/0199341 A1* | 8/2011 | Reinfried | G06F 3/044 345/176 |
| 2012/0019455 A1* | 1/2012 | Jin | G06F 3/0443 345/173 |
| 2014/0092325 A1* | 4/2014 | Chen | G06F 3/0416 349/12 |
| 2015/0015802 A1* | 1/2015 | Jeon | G06F 3/0446 349/12 |
| 2017/0262109 A1* | 9/2017 | Choi | H01L 51/56 |
| 2017/0285780 A1* | 10/2017 | Park | G06F 3/044 |
| 2018/0145256 A1* | 5/2018 | Yang | G06F 3/041 |
| 2019/0004653 A1* | 1/2019 | Won | G06F 3/0443 |
| 2019/0271911 A1* | 9/2019 | Wu | G03F 7/30 |

* cited by examiner

*Primary Examiner* — Ibrahim A Khan
(74) *Attorney, Agent, or Firm* — ScienBiziP, P.C.

(57) ABSTRACT

A touch module comprises a substrate, the substrate includes a central region and a peripheral region, the peripheral region is surrounding the central region. A first material layer is formed on a surface of the substrate by vapor deposition. The first material layer is etched to obtain a circuit layer. The circuit layer is located in the peripheral region. A composite material layer is laid down, the composite material layer comprises a second material layer. The second material layer is positioned in the central region. The composite material layer is etched by the photo-etching. The second material layer is etched to obtain a transparent conductive layer.

7 Claims, 12 Drawing Sheets

TOUCH MODULE, METHOD FOR MANUFACTURING THE SAME, AND ELECTRONIC DEVICE USING THE SAME

FIELD

The subject matter relates to a touch module.

BACKGROUND

Smart phone cover can include a touch module and a display module attached to the cover. The touch module includes a central area and a peripheral area surrounding the central area. The peripheral area of the touch module includes a circuit layer for transmitting signals. The central area of the touch module includes a conductive layer for touches. The circuit layer is made of a simple substance or alloy containing copper, and the conductive layer is generally made of silver. If the conductive layer and the circuit layer are simultaneously etched, the conductive layer may be over-etched by the etchant. The etchant remaining in the touch module can react with the copper in the circuit layer and the silver in the conductive layer to form a copper-silver alloy. The copper-silver alloy may cause a short circuit in the touch module.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
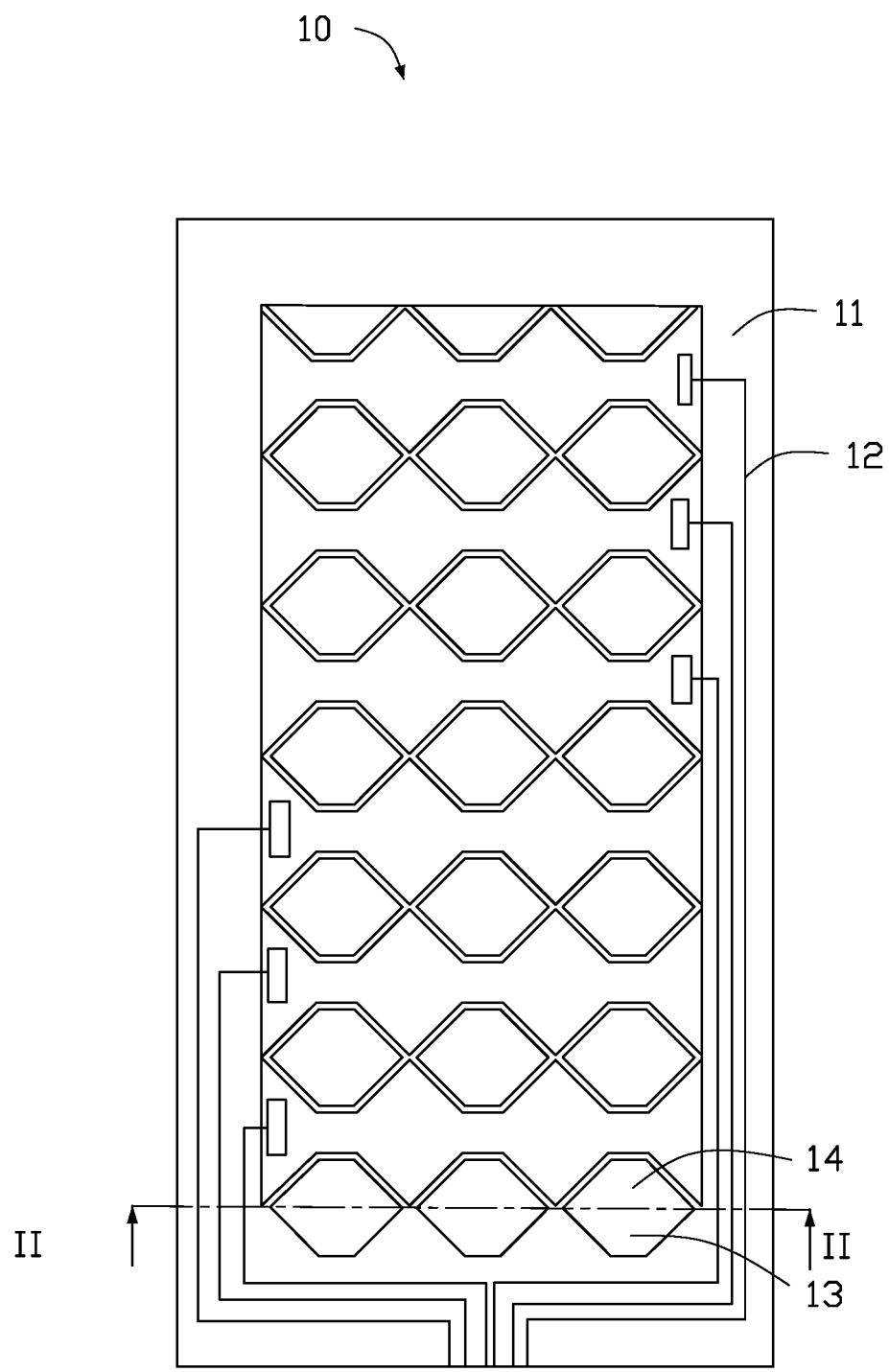
FIG. 1 is a top view of a touch module according to a embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

First Embodiment

Figure 2:
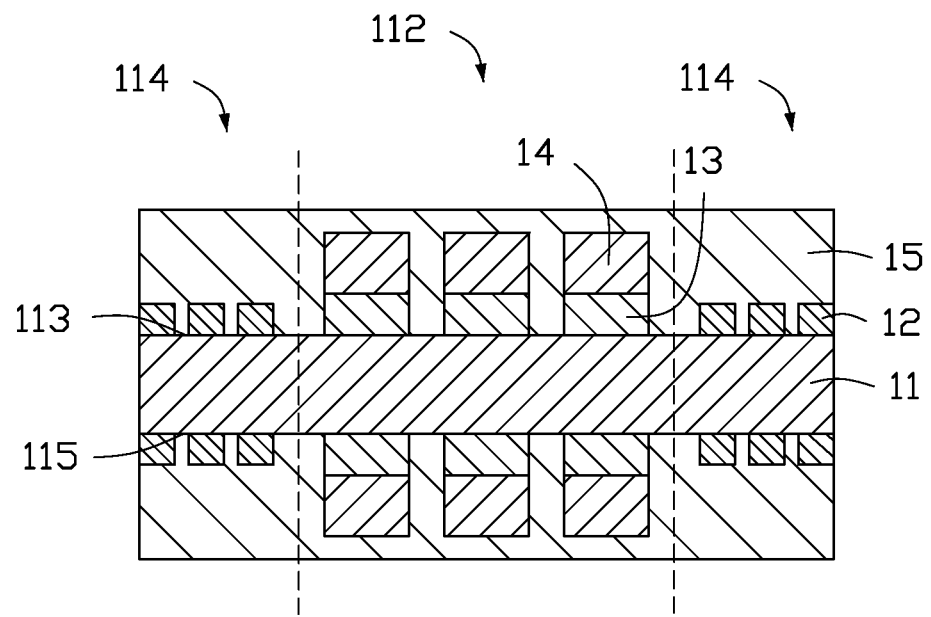
FIG. 2 is a cross-sectional view along a line II-II of FIG. 1.

Referring to FIG. 1 and FIG. 2, the touch module 10 includes a substrate 11, a circuit layer 12, a transparent conductive layer 13, and a barrier layer 14. The circuit layer 12 and the transparent conductive layer 13 are positioned on the substrate 11. The barrier layer 14 is positioned on the transparent conductive layer 13. The touch module 10 further includes a protective layer 15. The protective layer 15, the circuit layer 12, the transparent conductive layer 13, and the barrier layer 14 are positioned on same surface of the substrate 11. The protective layer 15 covers the circuit layer 12, the transparent conductive layer 13, and the barrier layer 14.

The substrate 11 may be made of a flexible material or a non-flexible material. In this embodiment, the substrate 11 is made of a flexible material, thus the touch module 10 can be applied to a curved display device or a flexible display device. The material of the substrate 11 may be organic, for example, polycarbonate (PC), polyimide (PI), polyethylene naphthalate two formic acid glycol ester (PEN), poly Polyethylene glycol terephthalate (PET), or Cyclo-olefin polymer (COP). The material of the substrate 11 may also be inorganic substance such as silicon dioxide ($SiO_2$). The substrate 11 includes a central region 112 and a peripheral region 114, the peripheral region 114 is surrounding the central region 112.

The circuit layer 12 is positioned on the peripheral area 114. The circuit layer 12 can be made of metal. The circuit layer 12 can also be made of a non-metallic material with electrical conductivity. The circuit layer 12 can also be made of a composite conductive material doped with conductive material. In this embodiment, the material of the circuit layer 12 is made of metal. A first material layer 21 is formed on the first surface 113 of the substrate 11 by physical vapor deposition (PVD) or chemical vapor deposition (CVD).

The transparent conductive layer 13 and the barrier layer 14 are positioned on the central region 112. The transparent conductive layer 13 is made of a conductive material, for example, indium tin oxide (ITO). The barrier layer 14 may be made of an organic substance with photosensitive properties, such as a photosensitive resin.

The transparent conductive layer 13 is fixed to the surface of the substrate 11 by press fitting or other attachment. The barrier layer 14 is positioned on a surface of the transparent conductive layer 13 away from the substrate 11.

The substrate 11 includes a first surface 113 and a second surface 115 opposite to each other. In one embodiment, the circuit layer 12, the transparent conductive layer 13, the barrier layer 14, and the protective layer 15 are all positioned on the first surface 113 or on the second surface 115. In other embodiments, the circuit layer 12, the transparent conductive layer 13, the barrier layer 14, and the protective layer 15 are positioned on both the first surface 113 and the surface of the second surface 115.

Figure 3:
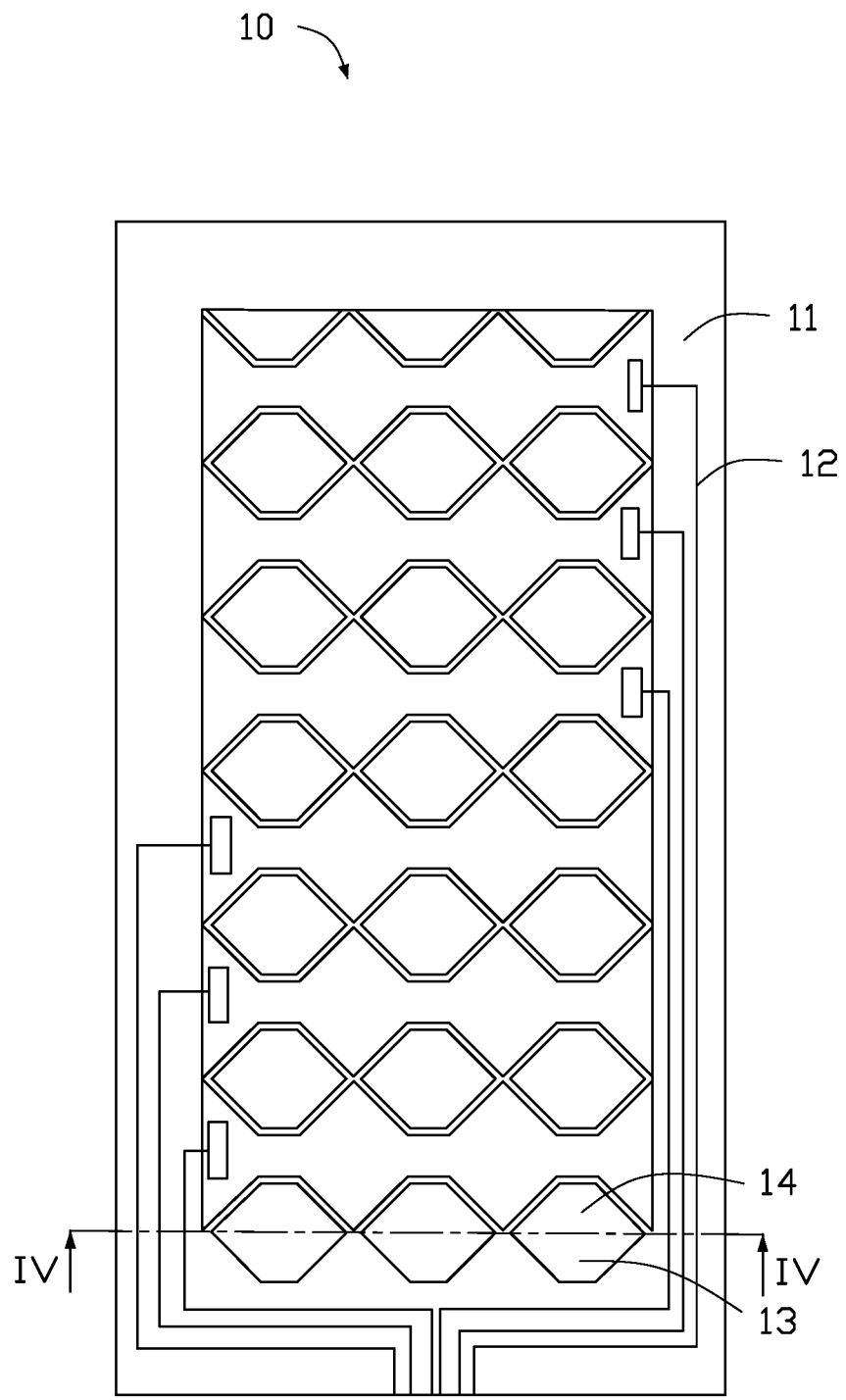
FIG. 3 is a top view of a touch module according to another embodiment of the present disclosure.
Figure 4:
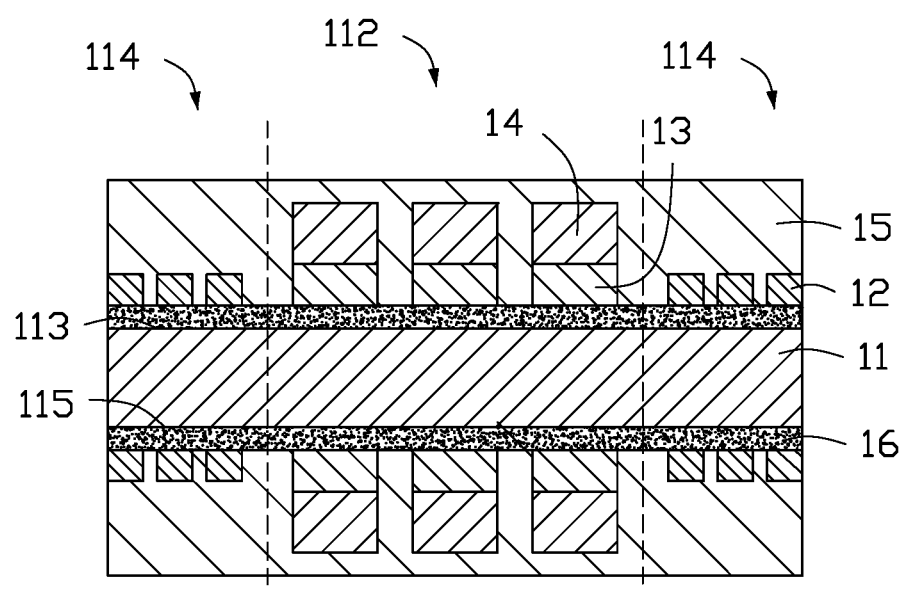
FIG. 4 is a cross-sectional view along a line IV-IV of FIG. 3.

Referring to FIG. 3 and FIG. 4, in other embodiment, the touch module 10 further includes a photoresist layer 16. The photoresist layer 16 is positioned on the substrate 11. The circuit layer 12, the transparent conductive layer 13, the barrier layer 14, and the protective layer 15 are positioned on a surface of the photo-resist layer 16 away from the substrate 11. The photoresist layer 16 blocks the transmission of light during exposure in photolithography process.

Figure 5:
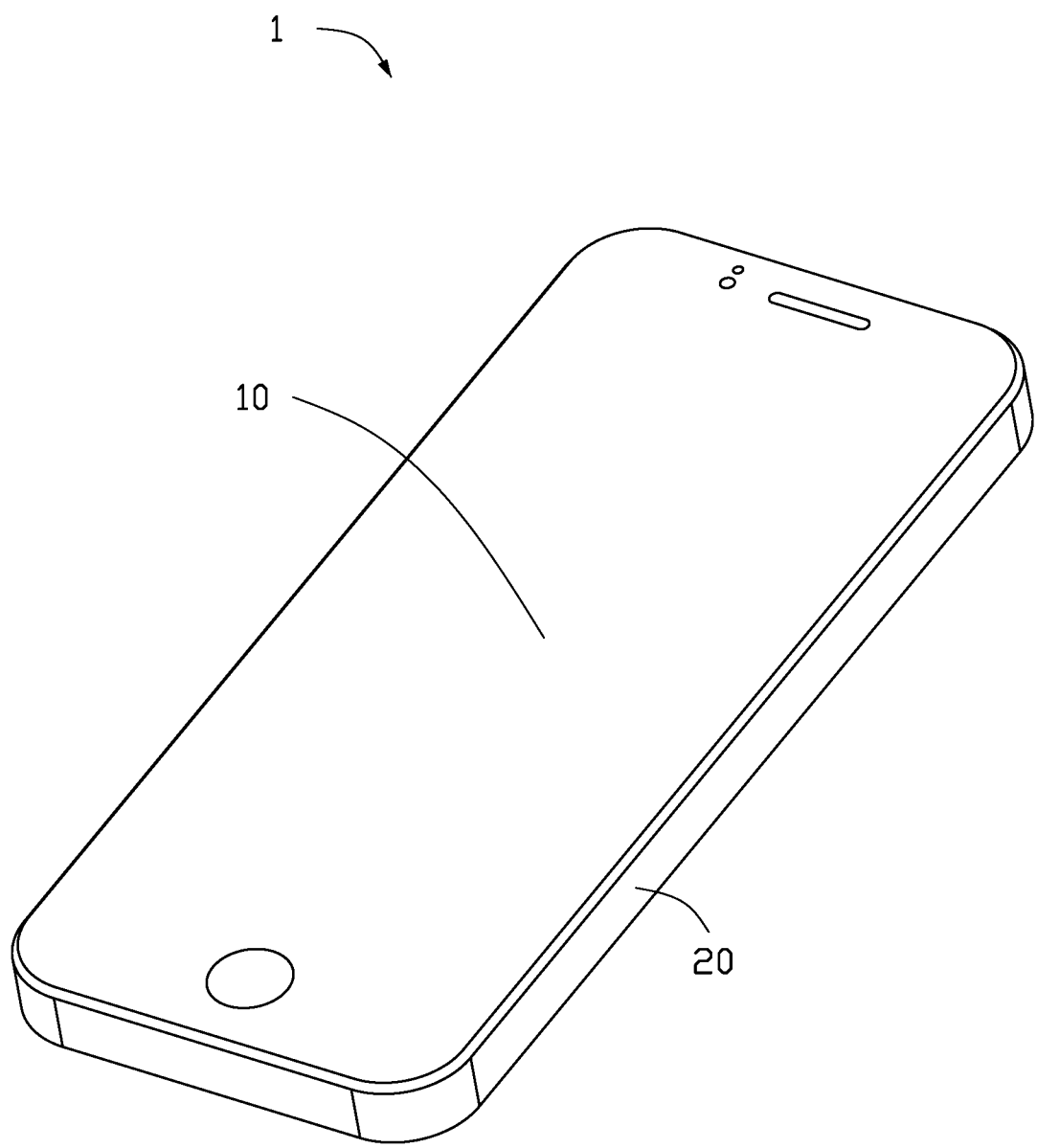
FIG. 5 is an isometric view of an electronic device including the touch module of the present disclosure.

Referring to FIG. 5, the electronic device 1 is a smart phone. The electronic device 1 may also be a tablet computer, a notebook computer, or other electronic device. The electronic device 1 includes a main body 20, and the touch module 10 is positioned in the main body 20.

Figure 6:
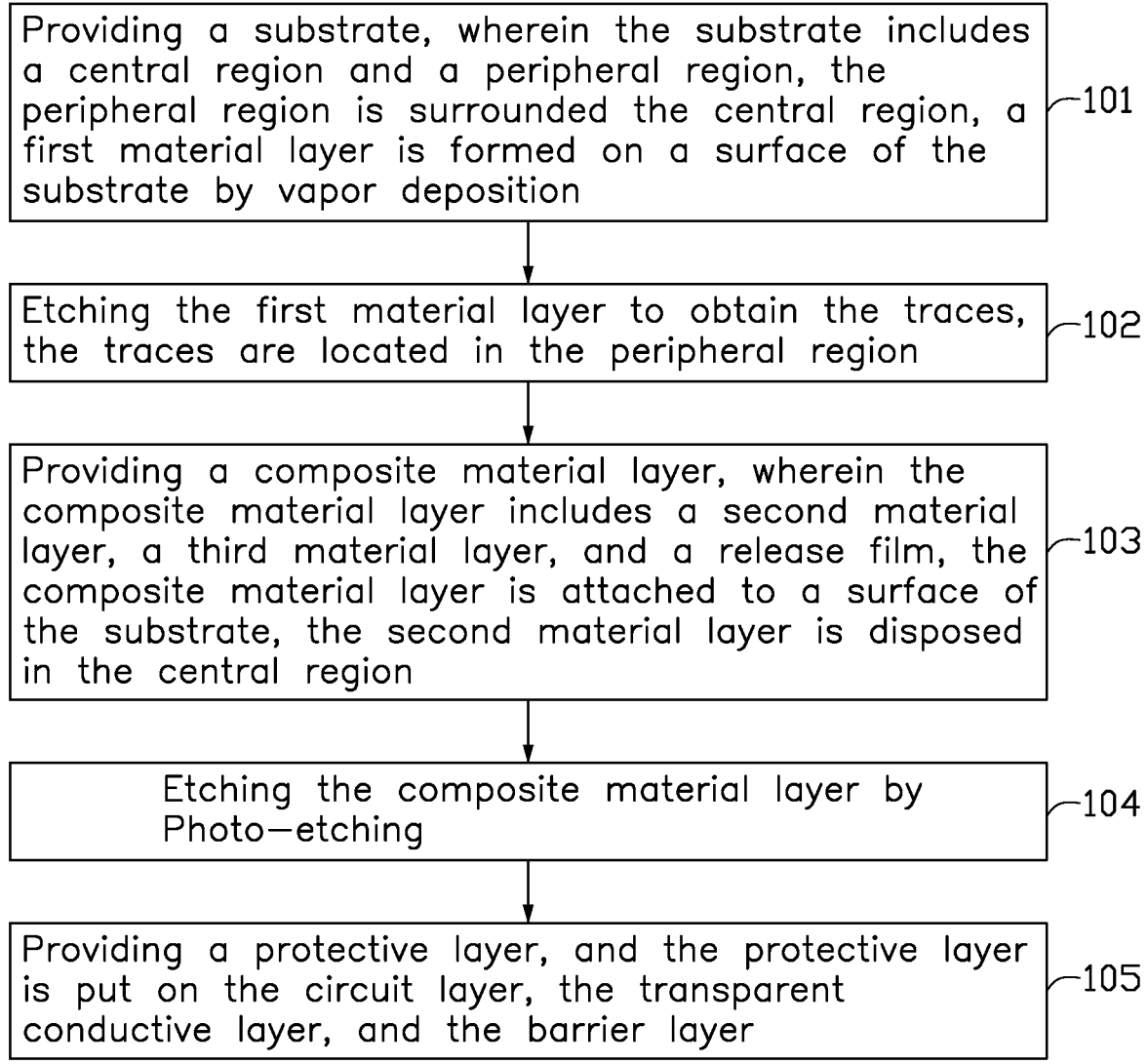
FIG. 6 is a flowchart of a method for manufacturing a touch module in accordance with an embodiment.

Embodiment of Method for Making Touch Module 10:

FIG. 6 illustrates a flowchart of a method for manufacturing a touch module 10 in accordance with an embodiment of the present disclosure. The method is provided by way of example, as there are a variety of ways to carry out the method. The described below can be carried out using the configurations illustrated in FIGS. 7-12, for example, and various elements of these figures are referenced in explaining example method. Each block shown in FIG. 6 represents one or more processes, methods, or subroutines, carried out in the example method. Additionally, the illustrated order of blocks is by example only and the order of the blocks can change. The method can begin at block 101.

Figure 7:
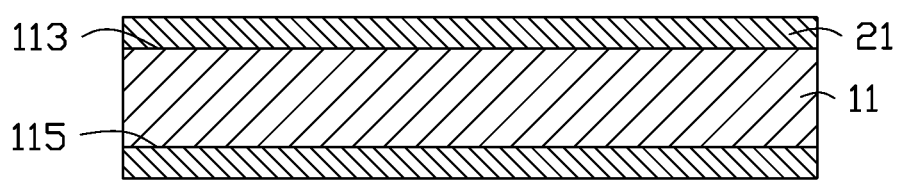
FIG. 7 is a cross-sectional view showing a first material layer formed on a substrate according to the method of FIG. 6.

At block 101, referring to FIG. 7, a substrate 11 is provided. The substrate 11 includes a central region 112 and a peripheral region 114, the peripheral region 114 is surrounding the central region 112. A first material layer 21 is formed on a surface of the substrate 11 by vapor deposition.

In the embodiment, the first material layer 21 is formed by physical vapor deposition (PVD) or chemical vapor deposition (CVD), and the first material layer 21 is formed on both the first surface 113 and the second surface 115 of the substrate 11. In another embodiment, the first material layer 21 is formed either on the first surface 113 or on the second surface 115 of the substrate 11.

Figure 8:
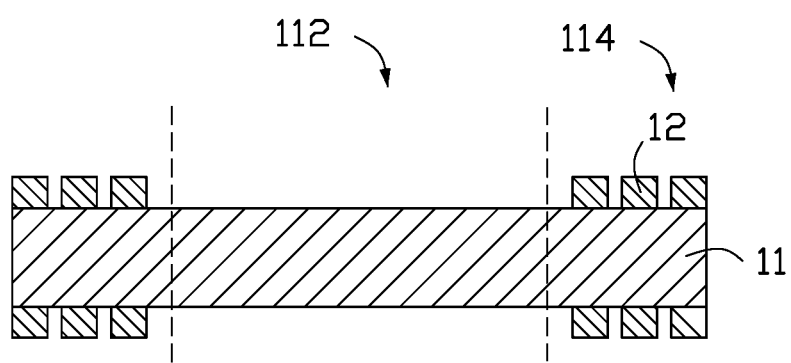
FIG. 8 is a cross-sectional view showing the first material layer of FIG. 7 etched to form a circuit layer.

At block 102, referring to FIG. 8, the first material layer 21 is etched to obtain the circuit layer 12. The circuit layer 12 is formed on the peripheral region 114.

A photosensitive mask is first formed on the first material layer 21. The photosensitive mask is exposed and etched to form patterns. The first material layer 21 is then etched through the photosensitive mask having the patterns. After the etching is completed, the photosensitive mask is removed, and thus the circuit layer 12 is obtained.

Figure 9:
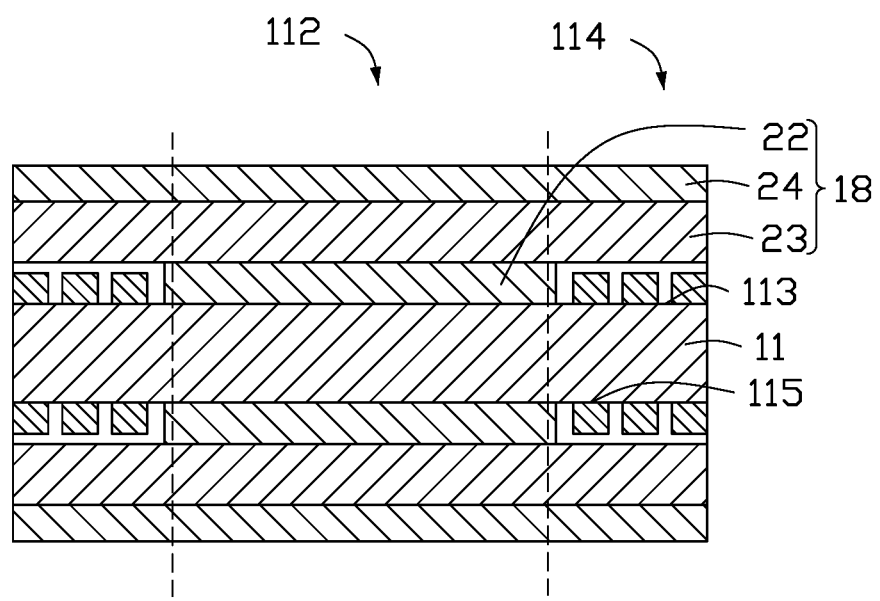
FIG. 9 is a cross-sectional view showing a composite material layer positioned on the substrate and covering the circuit layer of FIG. 8.

At block 103, referring to FIG. 9, a composite material layer 18 is provided. The composite material layer 18 includes a second material layer 22, a third material layer 23, and a release film 24. The composite material layer 18 is attached to a surface of the substrate 11. The second material layer 22 is positioned on the central region 112.

The second material layer 22 is not in contact with the circuit layer 12. The area of the third material layer 23 is larger than the area of the second material layer 22. The third material layer 23 covers the second material layer 22 and the circuit layer 12. The release film 24 is positioned on a surface of the third material layer 23 away from the second material layer 22. The second material layer 22 is made of transparent conductive material. The third material layer 23 may be made of photosensitive resin. The second material layer 22 can be formed on the third material layer 23 by coating. The second material layer 22 can be positioned on the substrate 11 by pressing.

Figure 10:
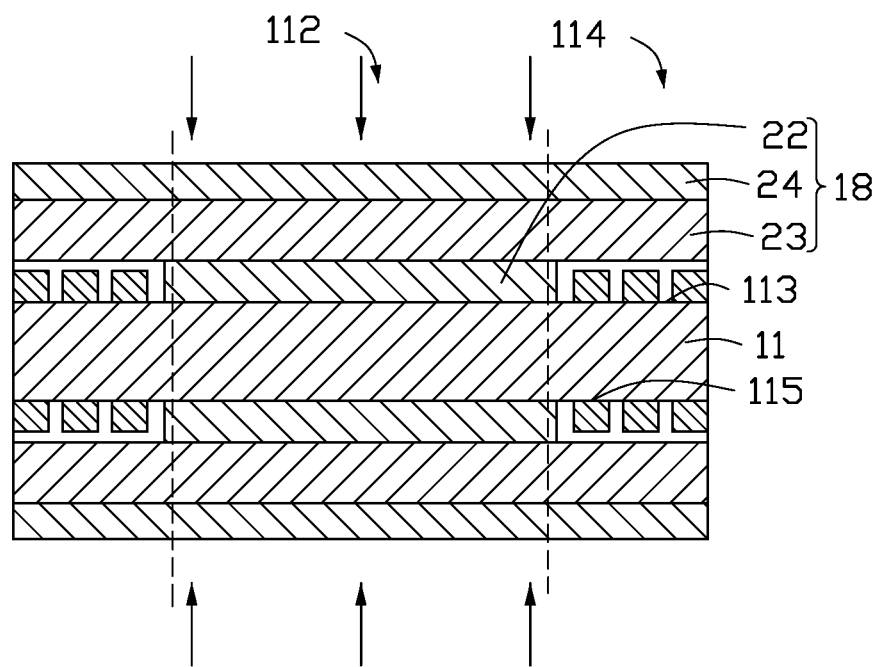
FIG. 10 is a cross-sectional view showing the composite material layer of FIG. 9 exposed to a light source.
Figure 11:
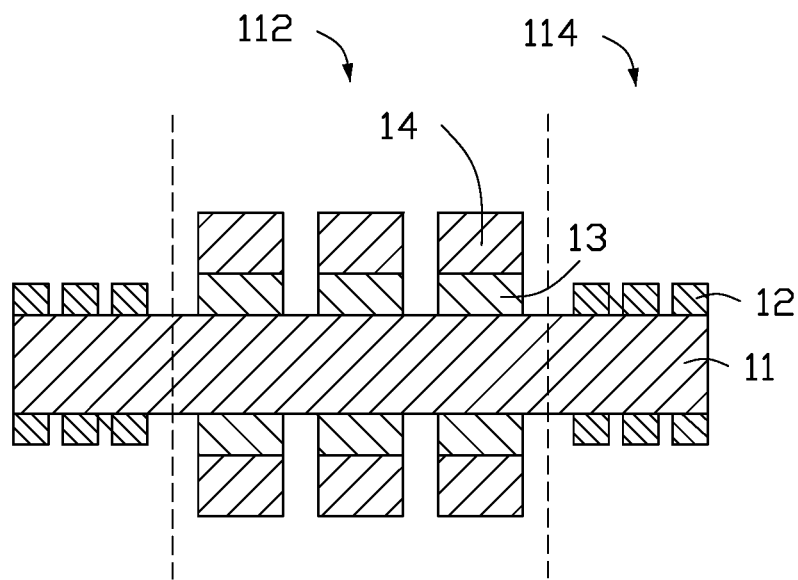
FIG. 11 is a cross-sectional view showing the composite material layer exposed to a light source of FIG. 10 and etched to form a transparent conductive layer and a barrier layer.

At block 104, referring to FIG. 10 and FIG. 11, the composite material layer 18 is etched by photo-etching.

A light source (not shown) is positioned on the side of the composite material layer 18 away from the substrate 11. The composite layer 18 is exposed to the exposure source. When the light from the light source arrives at the third material layer 23, the properties of the photosensitive material in the third material layer 23 are changed. Portions of the third material layer 23 can be etched by the etchant, and another portion of the third material layer 23 remains unetched. Then, the release film 24 is removed. The portion remaining in the third material layer 23 forms the barrier layer 14. The barrier layer 14 can function as the photoresist layer for the second material layer 22. Then, the second material layer 22 is etched to obtain a transparent conductive layer 13.

Figure 12:
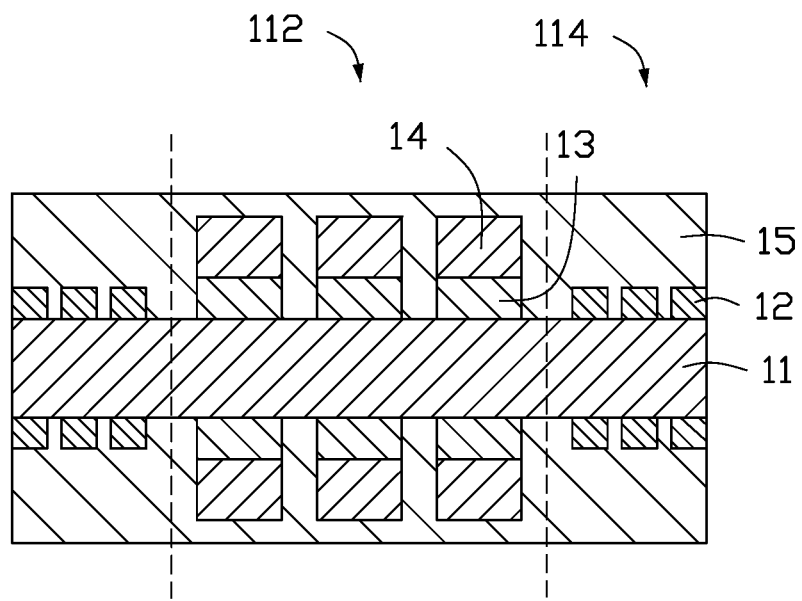
FIG. 12 is a cross-sectional view showing the circuit layer, the transparent conductive layer, and the barrier layer of FIG. 11 covered by a protective layer.

At block 105, referring to FIG. 12, a protective layer 15 is provided and is formed on the circuit layer 12, the transparent conductive layer 13, and the barrier layer 14.

The method for manufacturing the touch module 10 may further include providing a photoresist layer 16. The photoresist layer 16 is positioned on a surface of the substrate 11. Then, as shown in blocks 101 to 104, the circuit layer 12, the transparent conductive layer 13, the barrier layer 14, and the protective layer 15 are formed on the surface of photoresist layer 16 away from the substrate 11. Light sources of different exposures are used to irradiate the composite layer, the composite layer is positioned on both the first surface and the second surface simultaneously. The photo-resist layer 16 absorbs light emitted by the light source and blocks the light from penetrating from one side of the substrate 11 to the other side of the substrate 11.

The substrate 11 includes a first surface 113 and a second surface 115 opposite to each other. The same structures are formed on the first surface 113 and the second surface 115 away from the substrate 11. The irradiation and exposure processes are performed using the light source, the first surface 113 and the second surface 115 are simultaneously exposed.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for manufacturing a touch module, comprising:
   providing a substrate, wherein the substrate comprises a central region and a peripheral region surrounding the central region;
   forming a first material layer on the substrate by vapor deposition;
   etching the first material layer to obtain a circuit layer, wherein the circuit layer is located on the peripheral region;

providing a composite material layer, wherein the composite material layer comprises a second material layer, a third material layer and a release film, wherein the third material layer is positioned on a surface of the second material layer away from the substrate, and the release film is positioned on a surface of the third material layer away from the second material layer;

forming the composite material on the circuit layer, wherein the second material layer is positioned on the central region; and etching the composite material layer by photo-etching to form a transparent conductive layer.

2. The method of claim 1, wherein etching the composite material layer comprises:

exposing the composite material layer to a light source to etch the composite material; and removing the release film.

3. The method to claim 2, wherein the third material layer is etched, a portion of the surface of the second material layer which is in contact with the third material layer is exposed, and the second material layer is etched to obtain the transparent conductive layer.

4. The method of claim 2, wherein the substrate comprises a first surface and a second surface opposite to each other, the first material layer and the composite material layer are positioned on both the first surface and the second surface.

5. The method of claim 4, further comprising:

forming a photo-resist layer on at least one of the first surface and the second surface, wherein the first material layer is formed on a surface of the photo-resist layer away from the substrate.

6. The method of claim 5, further comprising:

using a plurality of exposure light sources to expose the composite layer, wherein the composite layer is positioned on both the first surface and the second surface simultaneously.

7. The method of claim 1, further comprising:

providing a protective layer; and forming the protective layer on the substrate, wherein the protective layer covers the transparent conductive layer and the circuit layer.

* * * * *